US011825231B2

(12) United States Patent
Cyrus

(10) Patent No.: US 11,825,231 B2
(45) Date of Patent: *Nov. 21, 2023

(54) SYSTEM AND METHOD FOR AUTOMATED DETECTION AND REPLACEMENT OF PHOTOGRAPHIC SCENES

(71) Applicant: Shutterfly, LLC, Redwood City, CA (US)

(72) Inventor: Leo Cyrus, Eden Prairie, MN (US)

(73) Assignee: Shutterfly, LLC, San Jose, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/342,199

(22) Filed: Jun. 8, 2021

(65) Prior Publication Data

US 2021/0377459 A1    Dec. 2, 2021

Related U.S. Application Data

(63) Continuation of application No. 16/816,065, filed on Mar. 11, 2020, now Pat. No. 11,057,576, which is a (Continued)

(51) Int. Cl.
*G06K 9/00* (2022.01)
*H04N 5/272* (2006.01)
(Continued)

(52) U.S. Cl.
CPC ............. *H04N 5/272* (2013.01); *G06N 3/084* (2013.01); *G06T 7/194* (2017.01); *G06T 7/44* (2017.01); *G06T 7/90* (2017.01); *H04N 5/2226* (2013.01)

(58) Field of Classification Search
CPC ............. G06T 7/194; G06T 5/005; G06T 2207/30196; G06T 2207/30201; G06T 2207/20081; G06T 2207/20084; G06T 7/11; G06T 7/10; G06T 7/40–596; G06T 7/90; G06T 2207/10024; H04N 5/272; H04N 5/2226; H04N 5/2723;
(Continued)

(56) References Cited

U.S. PATENT DOCUMENTS 5,799,213 A    8/1998 Saar
7,834,894 B2    11/2010 Swanson
(Continued)

*Primary Examiner* — Atiba O Fitzpatrick
(74) *Attorney, Agent, or Firm* — Merchant & Gould P.C.

(57) ABSTRACT

A method of identifying a background type in a photograph includes extracting a background image from a photograph, feeding the background image into a first convolution neural network to obtain a first decision, extracting color features in the background image, transforming the color features into a two-dimensional color feature matrix, feeding the two-dimensional color feature matrix into a second convolution neural network to obtain a second decision by the one or more computer processors, extracting texture features in the background image, transforming the texture features into a two-dimensional texture feature matrix image by the one or more computer processors, feeding the two-dimensional texture feature matrix into a third convolution neural network to obtain a third decision, computing a hybrid decision based on the first decision, the second decision, and the third decision, and identifying a background type in the background image based on the hybrid decision.

20 Claims, 13 Drawing Sheets

Related U.S. Application Data continuation-in-part of application No. 16/277,051, filed on Feb. 15, 2019, now Pat. No. 11,019,317.

(51) Int. Cl.

| | | |
|---|---|---|
| *G06T 7/90* | (2017.01) | |
| *H04N 5/222* | (2006.01) | |
| *G06T 7/44* | (2017.01) | |
| *G06T 7/194* | (2017.01) | |
| *G06N 3/084* | (2023.01) | |

(58) Field of Classification Search

CPC .......... H04N 2005/2726; H04N 5/275; G06K 9/6256; G06K 9/6257; G06K 9/6259; G06V 10/70; G06V 10/82; G06V 10/774–7796; G06V 20/00; G06V 20/30; G06V 20/36; G06V 20/70; G06V 10/25; G06V 10/87; G06V 30/19113; G06V 10/7753; G06N 3/02–126; G06N 20/00–20; G06N 3/0454; G06N 3/08; G06N 3/084

See application file for complete search history.

(56) References Cited

U.S. PATENT DOCUMENTS

| | | | |
|---|---|---|---|
| 9,838,661 | B2 | 12/2017 | Benson |
| 10,049,308 | B1* | 8/2018 | Dhua ................. G06K 9/6256 |
| 10,349,029 | B2 | 7/2019 | Benson |
| 11,019,317 | B2 | 5/2021 | Cyrus |
| 11,057,576 | B2 | 7/2021 | Cyrus |
| 2008/0001957 | A1 | 1/2008 | Hancock et al. |
| 2008/0019576 | A1 | 1/2008 | Senftner et al. |
| 2008/0181507 | A1 | 7/2008 | Gope et al. |
| 2009/0208106 | A1 | 8/2009 | Dunlop et al. |
| 2010/0009203 | A1 | 1/2010 | Negeno et al. |
| 2010/0092030 | A1 | 4/2010 | Golan et al. |
| 2013/0004446 | A1 | 2/2013 | Scharer |
| 2013/0044466 | A1 | 2/2013 | Scharer, III |
| 2013/0024324 | A1 | 9/2013 | Vonolfen |
| 2013/0243248 | A1 | 9/2013 | Vonolfen et al. |
| 2013/0259375 | A1 | 10/2013 | Dunlop et al. |
| 2017/0083762 | A1 | 3/2017 | Segalovitz et al. |
| 2019/0102604 | A1* | 4/2019 | Chang .................. G06K 9/627 |
| 2020/0186727 | A1 | 6/2020 | Denoue et al. |

* cited by examiner

Input portrait image

Mask of the portrait image

Background extracted from the portrait image

SYSTEM AND METHOD FOR AUTOMATED DETECTION AND REPLACEMENT OF PHOTOGRAPHIC SCENES

CROSS REFERENCE TO RELATED APPLICATIONS

This application is a continuation of U.S. application Ser. No. 16/816,065, filed Mar. 11, 2020, entitled SYSTEM AND METHOD FOR AUTOMATED DETECTION AND REPLACEMENT OF PHOTOGRAPHIC SCENES, which is a continuation-in-part of U.S. application Ser. No. 16/277,051, filed Feb. 15, 2019, now U.S. Pat. No. 11,019,317, entitled SYSTEM AND METHOD FOR AUTOMATED DETECTION AND REPLACEMENT OF PHOTOGRAPHIC SCENES, the disclosures of which are hereby incorporated by reference in their entireties. To the extent appropriate a claim of priority is made to each of the above-disclosed applications.

BACKGROUND

Portrait photographs are often taken with digital cameras in portrait studios or outside environments. One advantage that digital photography has over traditional film-based photography is that digital images can be further processed even after the camera has taken and stored the image. Because the digital images are fully described by digital data, digital processing can be used to manipulate that data in a wide variety of ways. Such digital processing includes detection, recognition, and replacement of photographic scenes in portrait photographs. A photographic scene can include a background behind a subject, a floor under the subject, etc. One or more components of a photographic scene can be replaced with one or more replacement images.

Chroma key technology is an example for replacing backgrounds in portrait photographs. In the portrait studios, the photographs are captured with the subjects in front of screen having a saturated blue or green color. An image processor detects the saturated blue or green color and replaces the background with a replacement background image. There are limitations to chroma key technology, however. For example, this technology only works with screens with specific saturated colors and does not work with screens in other colors or having patterns. It is difficult to accurately distinguish the subject from the background when the subject's clothing is similar in color to the selected background color.

SUMMARY

In general terms, this disclosure is directed to a system and a method that automatically detect and replace photographic scenes of different colors and different designs in photographs. The background and the floor portions in the photographic scenes are not required to have saturated colors or embedded patterns. In one non-limiting example, the disclosed system includes a photographic scene detection model trained to automatically detect and classify photographic scenes. The photographic scene detection model can be trained by machine learning. The training can be conducted over subjects of different characteristics in the subjects and exposure conditions, and a variety of scenes. The disclosed method and system are applicable to the background scene, as well as the floor scene and props which are difficult to detect even with saturated colors using conventional technologies. Various aspects are described in this disclosure, which include, but are not limited to, the following aspects.

One aspect is a method of identifying a background type in a photograph includes extracting a background image from a photograph, feeding the background image into a first convolution neural network by one or more computer processors to obtain a first decision, automatically extracting color features in the background image by the one or more computer processors, transforming the color features into a two-dimensional color feature matrix, feeding the two-dimensional color feature matrix into a second convolution neural network to obtain a second decision by the one or more computer processors, automatically extracting texture features in the background image, transforming the texture features into a two-dimensional texture feature matrix image by the one or more computer processors, feeding the two-dimensional texture feature matrix into a third convolution neural network to obtain a third decision by the one or more computer processors, computing a hybrid decision based on the first decision, the second decision, and the third decision, and identifying a background type in the background image based on the hybrid decision.

Implementations of the system may include one or more of the following. The method can further include multiplying the first decision by a first weight to produce a first weighted decision; multiplying the second decision by a second weight to produce a second weighted decision; and multiplying the decision third by a third weight to produce a third weighted decision, wherein the hybrid decision can be computed based on the first weighted decision, and the second weighted decision, and the third weighted decision. The hybrid decision can be an average, a sum, or a root-mean square function of the first weighted decision, the second weighted decision, and the third weighted decision. An error associated with a value of the hybrid decision can be minimized by backpropagation. Values of the first weight, the second weight, and the third weight can be updated by minimizing the error associated with the value of the hybrid decision. The color features include a histogram, a mean, a standard deviation, or popular color locations in the color space. Transforming the color features into a two-dimensional color feature matrix can include forming a color feature vector using the color features; and concatenating the color feature vector into the two-dimensional color feature matrix. The texture features can include a mean, a standard deviation, entropy, a range, co-occurrence matrix of image grey levels in the background image. Transforming the texture features into a two-dimensional texture feature matrix can include forming a texture feature vector using the texture features; and concatenating the texture feature vector into the two-dimensional texture feature matrix. The photograph can include one or more subjects in front of a background, wherein extracting a background image can include: locating borders of the one or more subjects; and masking the one or more subjects, wherein the background image is extracted outside the borders of the one or more subjects. The method can further include storing a set of background types in a computer memory; training a hybrid deep learning model using sample portrait images comprising the background types, wherein the hybrid deep learning model includes the first convolution neural network, the second convolution neural network, and the third convolution neural network; and obtaining the first weight, the second weight, and the third weight respectively associated with the first convolution neural network, the second convolution neural network, and the third convolution neural network. The method can further include replacing at least a portion of the background image in the portrait photograph by another background image.

Another aspect is a method of photographing a subject, comprising: storing a library of photographic scene designs in a computer memory, training a photographic scene detection model by a computer processing device using machine learning from sample portrait images comprising known photographic scenes defined in the library of photographic scene designs, capturing a production portrait photograph, using a digital camera, of a subject in a photographic scene that is defined by a photographic scene design in the library of photographic scene designs, automatically detecting the photographic scene in the production portrait photograph using the photographic scene detection model operating on one or more computer processors; and processing the production portrait photograph by an image processing system to personalize the photographic scene detected in the production portrait photograph.

Implementations of the system may include one or more of the following. The photographic scene can include a background portion, a floor portion, or a prop, wherein the step of automatically detecting the photographic scene in the production portrait photograph can include: automatically detecting one or more of a background portion, a floor portion, or a prop in the production portrait photograph using the photographic scene detection model operating on one or more computer processors. The step of training a photographic scene detection model by a computer processing device using machine learning can further include receiving sample portrait images with known photographic scenes as a first input; and receiving labels for the photographic scenes as a second input, wherein the labels are defined in the library of photographic scene designs. The step of training a photographic scene detection model by a computer processing device using machine learning can further include varying lighting conditions in the sample portrait images. The step of training a photographic scene detection model by a computer processing device using machine learning can further include varying expressions, poses, genders, ages, ethnicities, and clothing of subjects in the sample portrait images. The step of processing the production portrait photograph can further include distinguishing the subject from the photographic scene in the production portrait photograph. The step of processing the production portrait photograph can include replacing at least a portion of the photographic scene detected in the production portrait photograph by a replacement image. The step of processing the production portrait photograph can include: generating, by the image processing system, an image mask configured to remove the detected photographic scene from the production portrait photograph; masking, by the image processing system, the production portrait photograph with the image mask to extract the subject from the production portrait photograph; and applying, by the image processing system, a replacement image to the masked production portrait photograph. The method can further include detecting original shadows cast on the photographic scene and generating a shadow image configured to be overlapped on the replacement image.

Another aspect is a system for processing digital photographs, the system comprising: a computer storage that can store a library of photographic scene designs and a production portrait photograph captured at a photograph station; a computer system comprising one or more processing devices configured to train a photographic scene detection model using machine learning from sample portrait images comprising known photographic scenes defined in the library of photographic scene designs; and at least one computer readable storage device storing data instructions, which when executed by the processing device, cause the one or more processing devices to: automatically detect a photographic scene in the production portrait photograph using the photographic scene detection model, wherein the production portrait photograph includes a subject, wherein the photographic scene is defined by a photographic scene design in the library of photographic scene designs; and process the production portrait photograph to personalize the photographic scene detected in the production portrait photograph.

Yet another aspect is a photography station comprising: a digital camera that can capture a production portrait photograph; a photographic scene that can be photographed by the digital camera, wherein the photographic scene is defined in a library of photographic scene designs; a computer system comprising one or more processing devices; and at least one computer readable storage device storing data instructions, wherein the data instructions, when executed by the processing device, cause the one or more processing devices to: execute a photographic scene detection model that is trained using machine learning from sample portrait images comprising known photographic scenes defined in the library of photographic scene designs; automatically detect a photographic scene in the production portrait photograph using the photographic scene detection model, wherein the production portrait photograph includes a subject, wherein the photographic scene is defined by a photographic scene design in the library of photographic scene designs; and process the production portrait photograph to personalize the photographic scene detected in the production portrait photograph.

DETAILED DESCRIPTION

Figure 1:
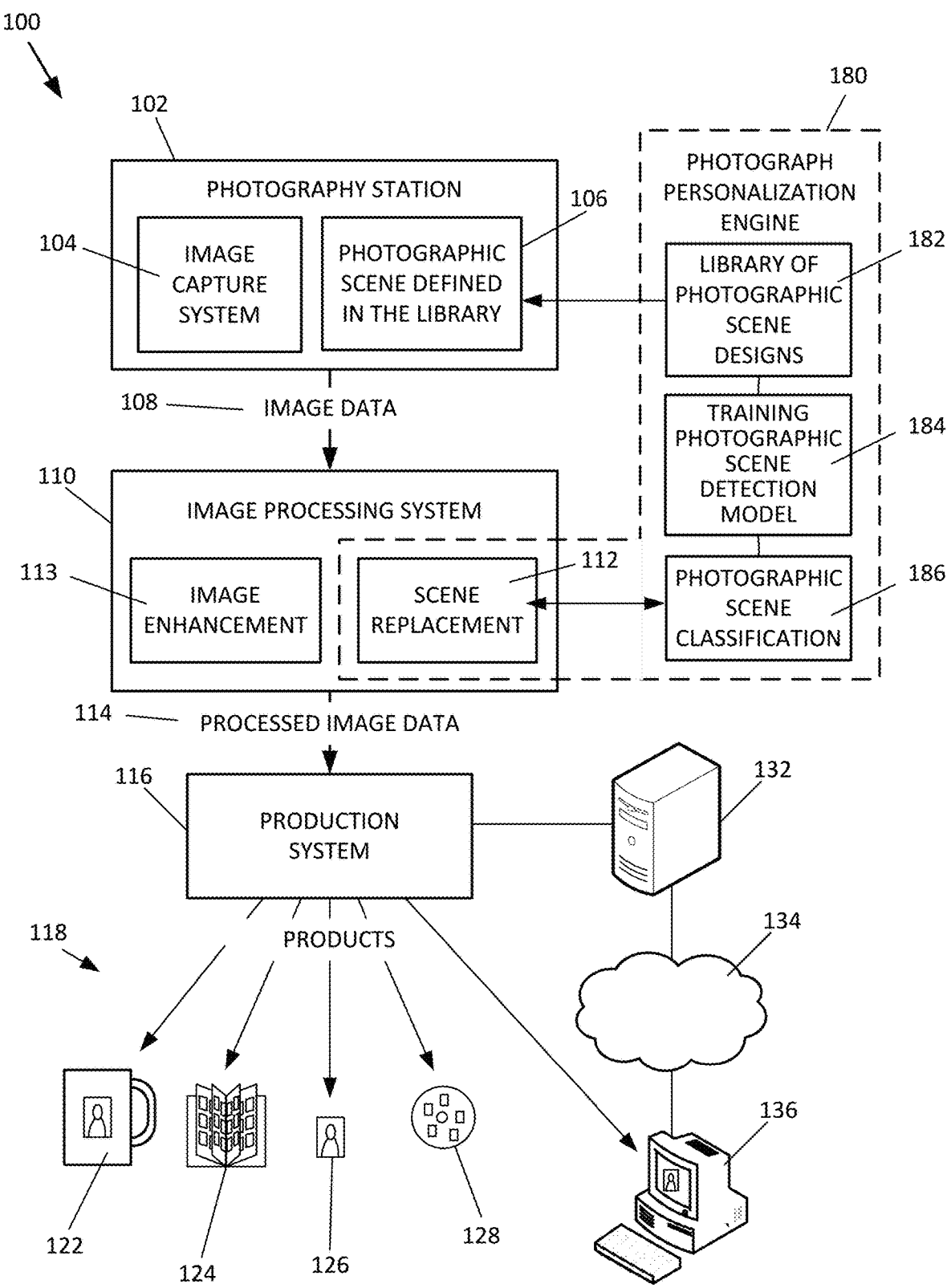
FIG. 1 is a schematic block diagram of an exemplified system in accordance to some embodiments of the present invention.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic block diagram of a system 100 for providing photographic scenes and capturing subjects in portrait photo sessions, processing the resulting portrait images, printing hardcopy portrait photographs and delivering them to recipients. The system 100 includes a photography station 102, an image capture system 104, a photographic scene 106, an original image data 108, an image processing system 110, a scene replacement module 112, an image enhancement module 113, a processed image data 114, a production system 116, and products 118.

The system 100 includes a photograph personalization engine 180, which includes a library of photographic scene designs 182, a module 184 for training a photographic scene detection model, and a photographic scene classification model 186.

In some embodiments, the photography station 102 is a portrait photography station that captures portraits of subjects, such as humans, animals, or inanimate objects. The photographic scene 106 for the portrait photography at the photography station 106 is defined by one of the photographic scene designs in the library of photographic scene designs 182.

The photography station 102 is a location installed with a set of equipment, where a digital image is captured with the image capture system 104. In some embodiments, the photography station 102 is a professional photography studio where subjects go to have their photographs taken. In other embodiments, the photography station 102 is a mobile photography studio, which is portable so that it can be set up at a remote location, such as in a school, a church, or other building or location. An example of the photography station 102 is illustrated and described in more detail with reference to FIG. 2.

The image capture system 104 operates to capture an image of one or more subjects in the photography studio. To properly account for different exposure scenarios and different background materials, the image capture system 104 can be calibrated using a gray card for exposure correction or color balance before the images are enhanced (113) and personalized (180). An example of the image capture system 104 is illustrated and described in more detail with reference to FIG. 3.

The photographic scene 106 is an area or scenery that appears behind the one or more subjects from the perspective of the image capture system 104, so that the photographic scene appears in the background of the image captured by the image capture system 104 of the one or more subjects. In some embodiments, at least part of the photographic scene 106 is also placed in front of the subjects and/or underneath the subjects as a floor, for example. In some embodiments, the scenes of the photographs are replaced with different image scenes or artwork after the photographs have been captured. As described below, the photographic scene 106 is configured to at least partially automate the scene replacement and result in a high-quality replacement.

The photographic scene 106 is made of at least one sheet that is formed of one or more materials. The photographic scene 106 includes a background portion (172 in FIG. 5) and a floor portion (174 in FIG. 5). Unlike conventional chromekey technology, the background portion and the floor portion can have a wide range of colors, patterns, and designs, and are not limited saturated colors.

The background portion and the floor portion can have substantially uniform colors (saturated or neutral) at different densities, or varying patterns such as grid, wavy patterns, stars, flowers, etc. An example of the photographic scene 106 is illustrated and described in more detail with reference to FIG. 5.

The image data 108 is transferred to the image processing system 110 over a wired or wireless network, such as the Internet (e.g., network 134), or a local area network, or over a computer readable medium.

The image processing system 110 is a system that receives the image data 108 and processes the original image data 108 to generate the processed image data 114. In some embodiments, the image processing system 110 operates to store the processed image data 114 in a computer-readable medium. In some embodiments, the processed image data 114 includes the image data 108 as well as additional data that can be applied to the original image data 108. In other embodiments, the processed image data 114 includes only the additional data pertaining to the image data 108. In some of these embodiments, the original image data 108 is separately provided to production system 116.

The image processing system 110 operates to execute the scene replacement module 112 and the image enhancement module 113, wherein the scene replacement module 112 is also part of the photograph personalization engine 180. The image enhancement module 113 can conduct image operations such as noise reduction, contrast adjustment, red eye removal, sharpening, retouching, etc.

Figure 6:
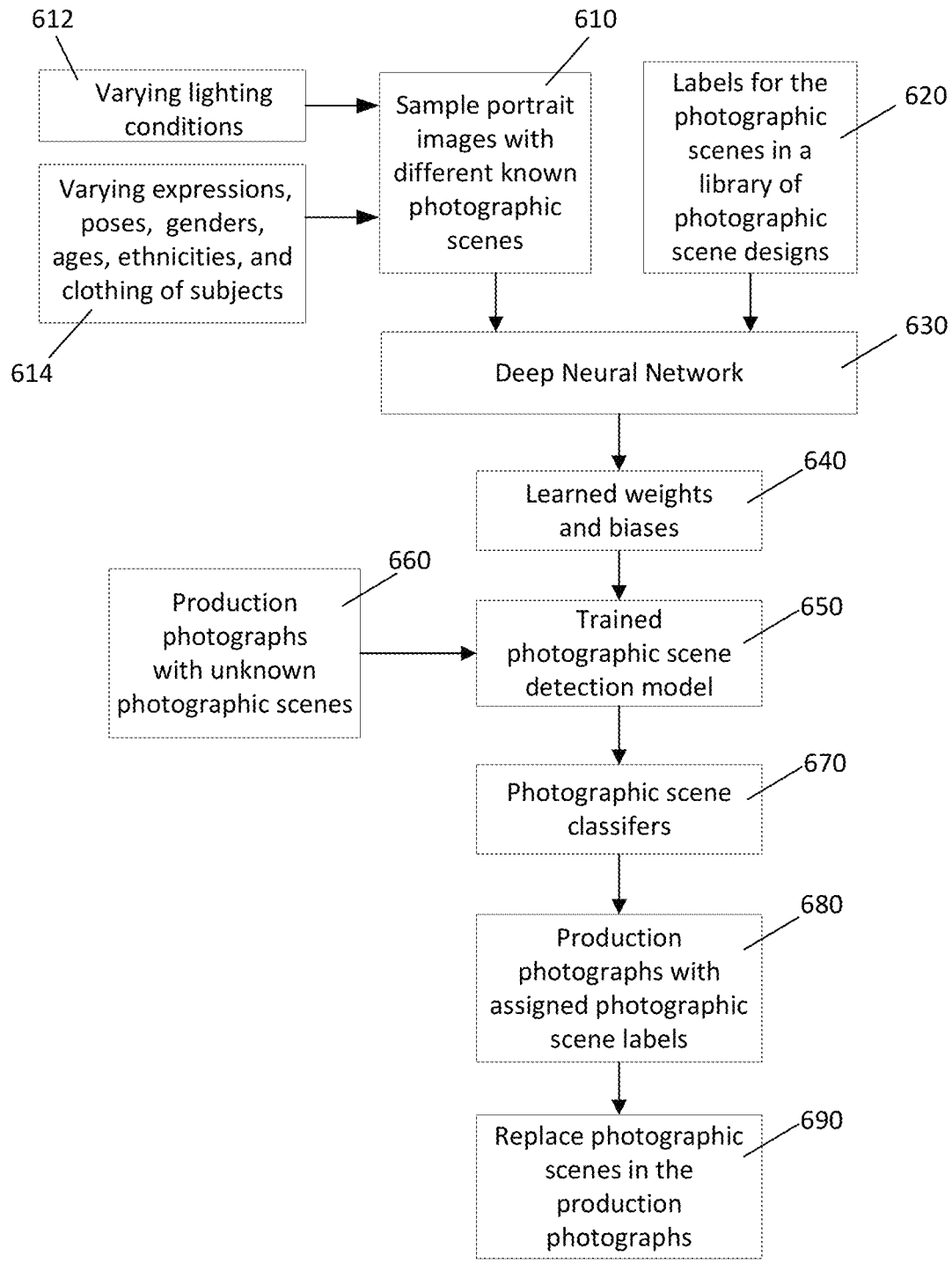
FIG. 6 shows a flow chart for detecting, classifying, and replacing photographic scenes in portrait images in accordance to some embodiments of the present invention.

Detailed operations of the photograph personalization engine 180 are shown in FIG. 6. Key functions of the photograph personalization engine 180 include the storage of designs of photographic scenes to be used at the photography stations 102, and the training of a photographic scene detection model using machine learning and a large sample of portrait images with varying scenes, subjects, and other parameters. The trained photographic scene detection model can automatically detect and classify photographic scenes in portrait photographs, which enable replacement of one or more components of the original scene by a different one in the image processing system 110. Thus, the background scene, the floor scene, and the stage props can all be detected and recognized, and can be separately personalized by a different color or a different pattern.

Figure 7:
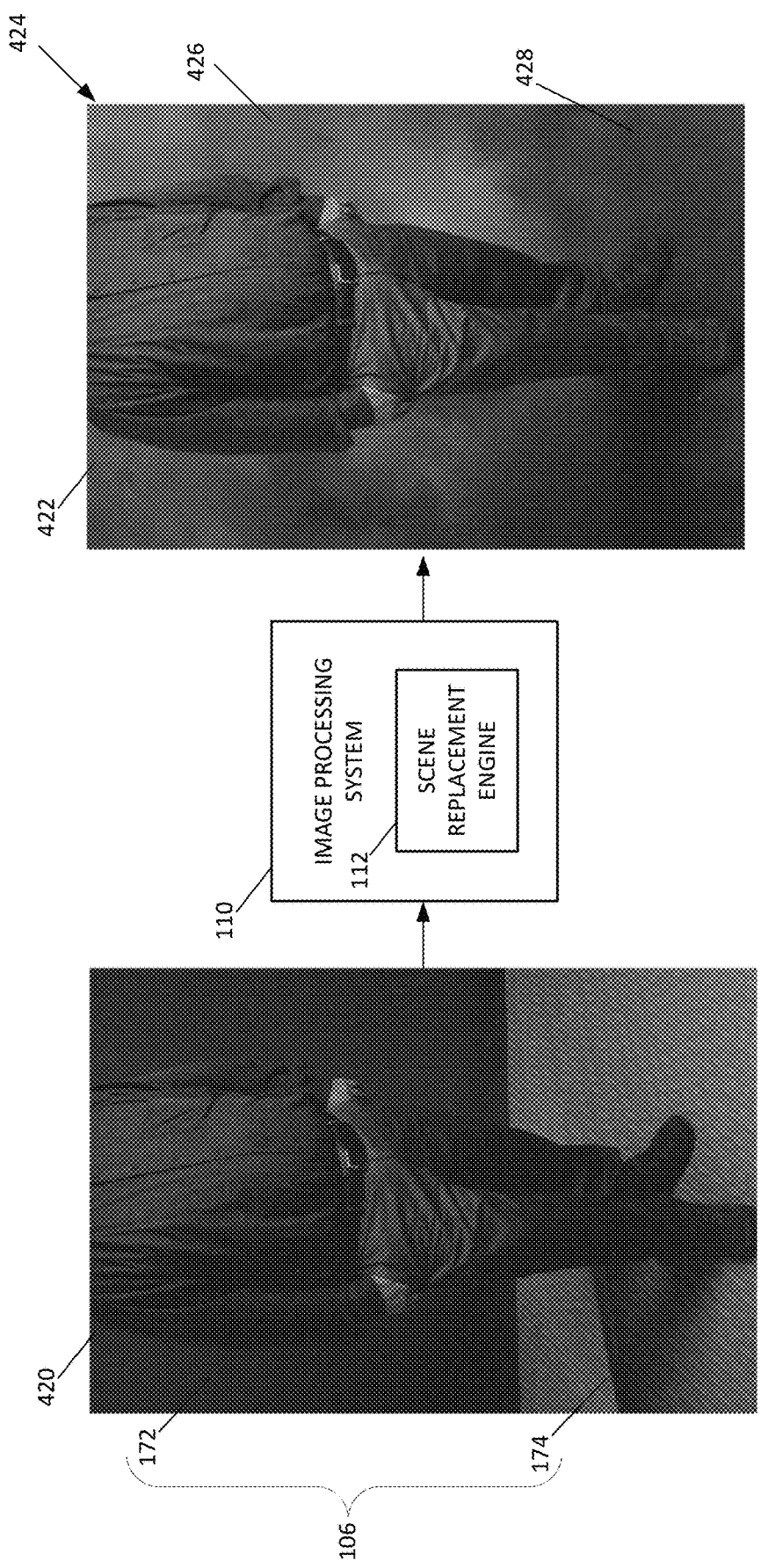
FIG. 7 is a schematic diagram illustrating an image processing system with an example scene replacement engine.

The scene replacement module 112 is configured to replace the photographic scene 106 with a replacement image 424 (FIG. 7). An example of the scene replacement module 112 is illustrated and described in more detail with reference to FIGS. 6, 9 and 10. For example, the background portion and the floor portion in a production portrait image can be replaced by a scenery scene of the Golden Gate Bridge or the Eiffel Tower.

After the processed image data 114 has been generated, it is provided to the production system 116, which uses the processed image data 114 to produce one or more products 118. Examples of the products 118 include a photo mug 122, a picture book 124, a photograph 126, a computer-readable medium 128 storing digital image data, and digital images delivered across network 134. Other examples of products include a composite product (composed of multiple different images), a photo mouse pad, a collage, a key tag, a digital picture frame or digital key chain, a photo card (such as a student identification card, driver's license, holiday or greeting card, security badge, baseball or other sports card, luggage tag, etc.), a photo magnet, an ornament, a puzzle, a calendar, a tote bag, a photo keepsake box, a t-shirt, an apron, or a variety of other products including a photographic image.

In some embodiments, production system 116 includes a web server 132 that is configured to communicate data across a network 134, such as to send products in the form of digital data to a client computing system 136. For example, in some embodiments, the web server 132 is in data communication with the network 134 and hosts a web site. The network 134 is a digital data communication network, such as the Internet, a local area network, a telephone network, or a smart phone network. A customer uses a client computing system 136 to communicate across the network 134, and accesses the web site of the server 132, such as by using a browser software application operating on the client computing system 136. In some embodiments, the customer can purchase products through the web site, or can access products that were previously purchased. The products can then be downloaded to the client computing system 136, where they are stored in memory. In some embodiments, the products continue to be hosted on the server 132, but the customer is provided with links that can be inserted into the customer's own web pages or on third party web sites (e.g., Shutterfly®, Facebook®, etc.) to allow others to view and/or download the products.

The above description of system 100 provides examples of some of the possible environments in which the image processing system 110 can be implemented. Other embodiments are implemented in yet other systems or environments. Any of the systems described herein can be implemented by one or more devices as additional embodiments.

The photography station 102, the image processing system 110, the photograph personalization engine 180, and the production system 116 can include or can be implemented by computer servers and processors that are connected by a wired or wireless computer network.

Figure 2:
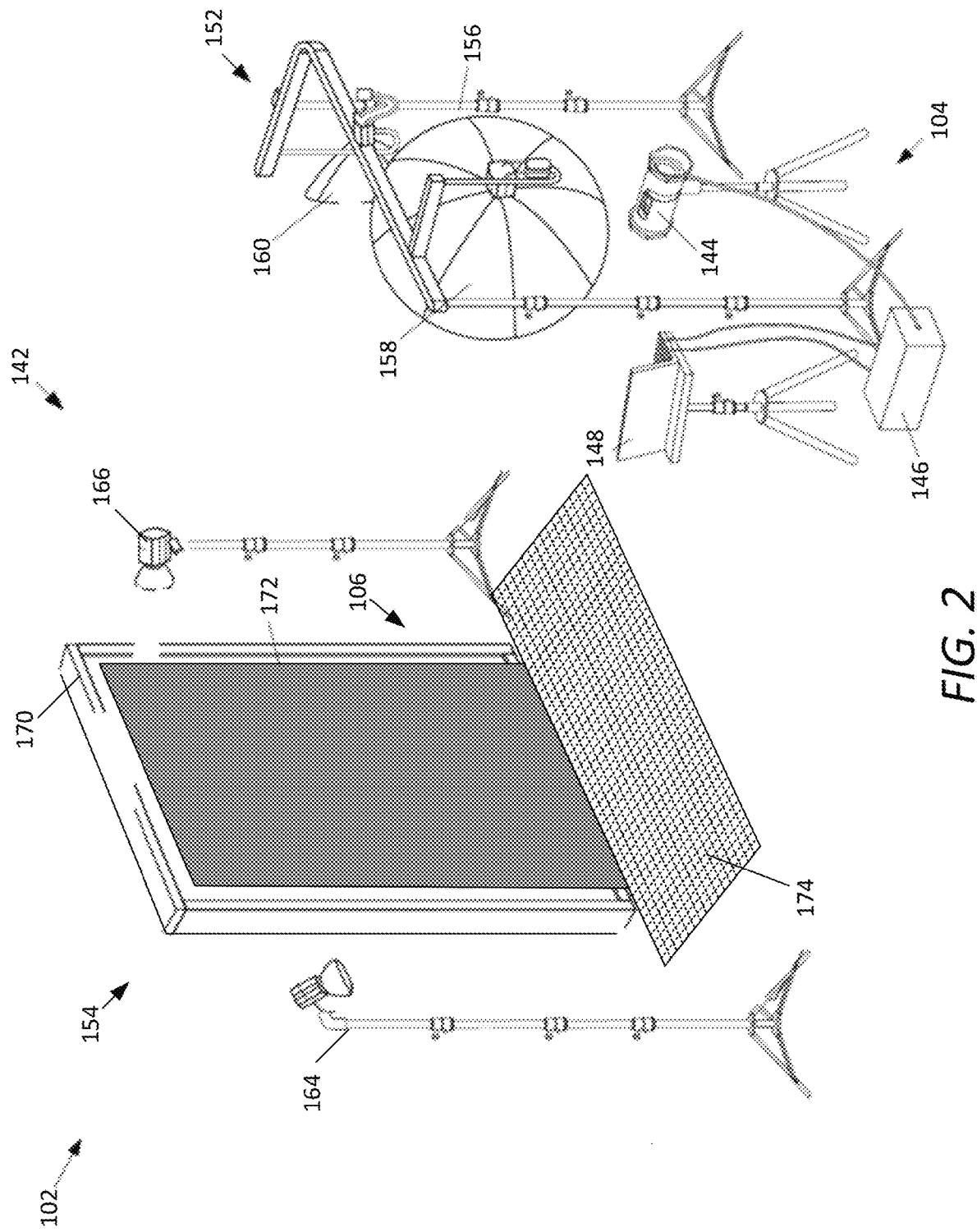
FIG. 2 is a schematic perspective diagram of an exemplified photography station.

FIG. 2 is a schematic perspective diagram of an example photography station 102. In one example, the photography station 102 includes the image capture system 104 and a station assembly 142. In some embodiments, the image capture system 104 includes a camera 144, a controller 146, and a computing device 148. In some embodiments, the station assembly 142 includes a forward portion 152 and a rearward portion 154. The forward portion 152 includes, for example, a stand 156 that supports a main light 158 and a fill light 160. The rearward portion 154 includes, for example, a hair light device 164, a background light device 166, and a frame 170 that supports the photographic scene 106. In some embodiments, the photographic scene 106 includes a background scene 172 and a floor scene 174. In some embodiments, the photographic scene 106 can also include props such as a chair, a bed or a crib, a floor pillow, a signage, a fence, a face mask, objects such as cubes and balls, a religious symbol or ornament, and sports equipment such as a basketball, soccer ball, baseball bat, or a rowing paddle.

The image capture system 104 operates to capture an image of one or more subjects in the photography studio, and, in some embodiments, to control the overall operation of the photography station 102. For example, in some embodiments, the image capture system 104 performs setup checks to ensure that the photography station 102 is properly set up, to capture digital images of a subject, and to monitor the operation of the photography station 102 while the images are being captured to alert the photographer to potential problems.

The camera 144 is typically a digital camera that operates to capture digital images of one or more subjects. An example of camera 144 is described and illustrated in more detail herein with reference to FIG. 3.

The camera 144 is typically mounted on a tripod or other support structure. In some embodiments, the height of the camera 144 is adjusted by a motor coupled to a shaft of the tripod. When the motor rotates, the shaft of the tripod extends or contracts to raise or lower the camera 144. In some embodiments, the camera 144 is mounted to the shaft at a fixed and non-variable angle relative to the vertical shaft of tripod.

The controller 146 operates to control and coordinate the operation of various components of the photography station 102. An example of controller 146 is described in more detail with reference to FIG. 4.

In this example, the controller 146 is electrically connected to the camera 144, the computing device 148, and the lights 158, 160, 164, and 166, such as via one or more wires or data communication cables. In another possible embodiment, wireless communication is used to communicate between a wireless communication device of the controller 146 and a wireless communication device of one or more of the camera 144 and the lights 158, 160, 164, and 166. An example of a wireless communication protocol is the 802.11 a/b/g/n communication protocol. Other embodiments use a custom wireless communication protocol. Wireless communication includes radio frequency communication, infrared communication, magnetic induction communication, or other forms of wireless data communication.

In some embodiments, the computing device 148 operates to interface with a user, such as the photographer. The computing device 148 generates a graphical user interface, such as to provide instructions to the user, warn the user of potential problems, display a live video feed preview from camera 144, and display an image after it has been captured.

The computing device 148 also operates to receive input from the user in some embodiments. In some embodiments, the computing device 148 includes a keyboard, a touch pad, a remote control, and a barcode scanner that receive input from the user.

In some alternate embodiments, one or more of the camera 144, the controller 146, and/or the computing device 148 are a single device. For example, in some embodiments, the camera 144 and the controller 146 are configured as a single device that captures digital images and performs control operations of controller 146. In another possible embodiment, the controller 146 and the computing device 148 are a single device. In yet another possible embodiment, the camera 144, the controller 146, and the computing device 148 are all a single device. Other combinations are used in other embodiments. Further, in yet other embodiments additional devices are used to perform one or more functions of these devices.

In some embodiments, the station assembly 142 generally includes the forward portion 152 and the rearward portion 154. The forward portion 152 is configured to be positioned in front of the subject when an image of a subject is captured. The rearward portion 154 is configured to be positioned behind the subject when an image of the subject is captured.

In this example, the forward portion 152 includes the stand 156 that supports the main light 158 and the fill light 160. Other embodiments include more or fewer lights. In some embodiments, the main and fill lights 158 and 160 include a flash bulb and a diffuser that surrounds the bulb. In other embodiments, the main and fill lights 158 and 160 are configured to provide continuous lighting for several purposes. For example, the continuous lighting is used for recording videos. The lights 158 and 160 are synchronized and controlled by the controller 146.

The rearward portion 154 includes, for example, the hair light device 164, the background light device 166, and the frame 170 that supports the photographic scene 106.

The hair light 164 is typically arranged above and behind the subject to illuminate the top of the subject's head. The background light 166 is provided to illuminate the photographic scene 106. In this example, the background light 166 is arranged forward of the photographic scene 106. In other embodiments, the background light 166 is arranged behind the frame 170. The background light 166 is preferably arranged so that it does not significantly illuminate a side of the subject that is facing the camera 144.

The frame 170 is configured to hold the photographic scene 106 in place. In some embodiments, the photographic scene 106 is hung at a top portion of the frame 170. In other embodiments, the photographic scene 106 is supported by the frame 170 in any manner.

The photographic scene 106 provides an area or scenery behind the subjects standing in front of the image capture system 104. The subject is arranged between the image capture system 104 and the photographic scene 106. In some embodiments, the photographic scene 106 includes a background scene 172 and a floor scene 174. The photographic scene 106 is described and illustrated in more detail with reference to FIG. 5.

Figure 3:
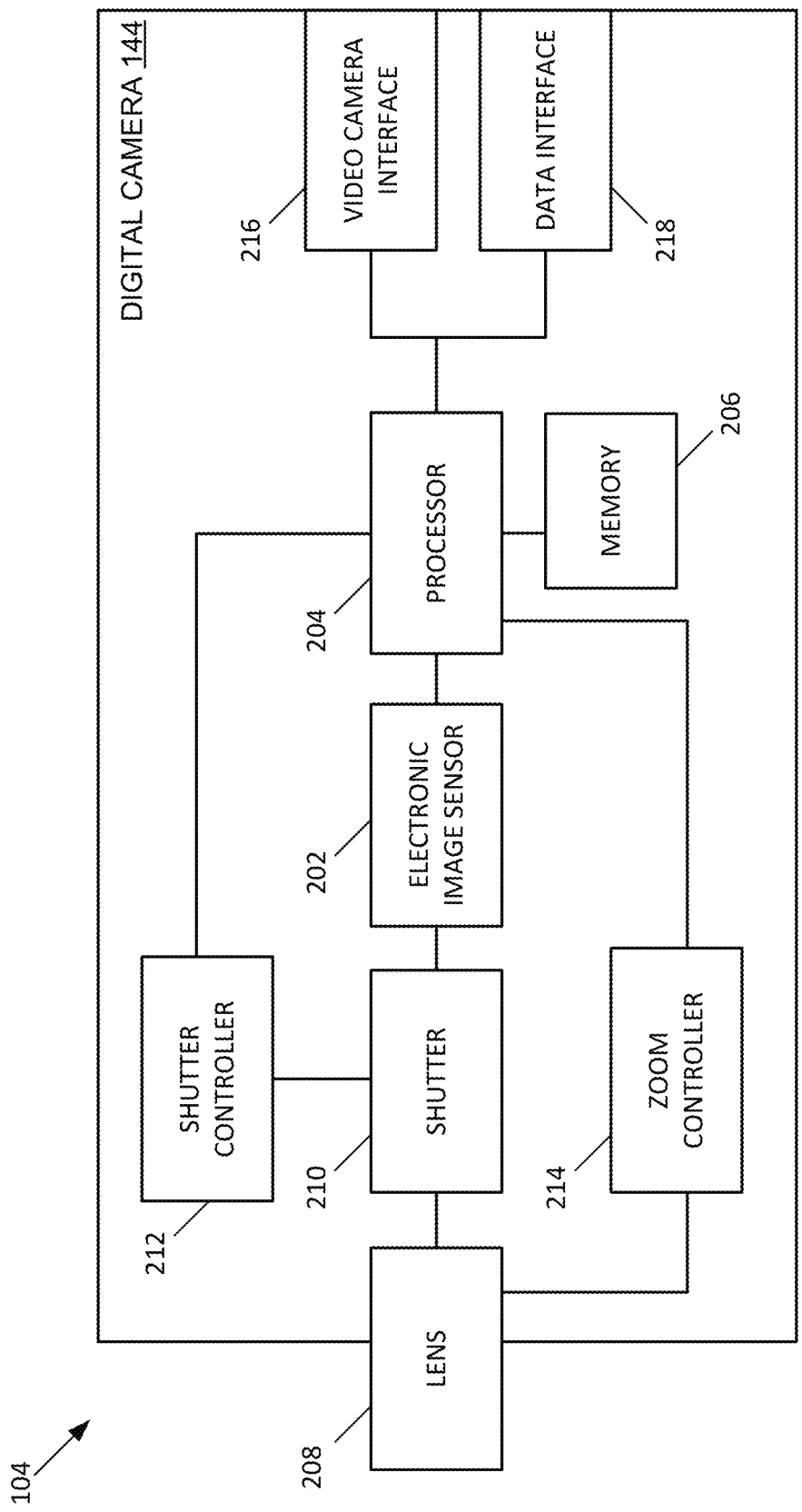
FIG. 3 is a schematic block diagram of an exemplified camera.

Referring to FIG. 3, the camera 144 is typically a digital camera including at least an electronic image sensor 202 for converting an optical image to an electric signal, a processor 204 for controlling the operation of the camera 144, and a memory 206 for storing the electric signal in the form of digital image data.

An example of the electronic image sensor 202 is a charge-coupled device (CCD). Another example of the electronic image sensor 202 is a complementary metal-oxide-semiconductor (CMOS) active-pixel sensor. The electronic image sensor 202 receives light from a subject and background and converts the received light into electrical signals. The signals are converted into a voltage, which is then sampled, digitized, and stored as digital image data in the memory 206.

The memory 206 can include various different forms of computer readable storage media, such as random-access memory. In some embodiments, the memory 206 includes a memory card. A wide variety of memory cards are available for use in various embodiments. Examples include: a CompactFlash (CF) memory card (including type I or type II), a Secure Digital (SD) memory card, a mini Secure Digital (mini SD) memory card, a micro Secure Digital (microSD) memory card, a smart media (SM/SMC) card, a Multimedia Card (MMC), an xD-Picture Card (xD), a memory stick (MS) including any of the variations of memory sticks, an NT card, and a USB memory stick (such as a flash-type memory stick). Other embodiments include other types of memory, such as those described herein, or yet other types of memory.

In some embodiments, the camera 144 includes three main sections: a lens 208, a mechanical shutter 210, and a CCD element 202. Generally, the CCD element 202 has relatively rapid exposure speeds. However, the process of moving the captured image from the CCD element 202 to an image storage area such as the memory 206 is slower than the time to acquire the image. Accordingly, in order to reduce the time between acquiring the backlit and front-lit images as discussed herein—preferably to further reduce any motion of the foreground object in the time period between shots—some embodiments include a CCD element 202 that is an interline transfer CCD. This type of CCD element 202 includes arrays of photodiodes interspaced with arrays of shift registers. In operation, after capturing a first image, photodiodes transfer the electrons to the adjacent shift registers and become ready thereafter to capture the next image. Because of the close proximity between the photodiodes and associated shift registers, the imaging-transfer cycles can be very short. Thus, in some embodiments, the digital camera 144 can rapidly capture a first image, transfer the first image to a memory 206 (where it is temporarily stored) and then capture a second image. After the sequence of images, both of the images can be downloaded to the appropriate longer-term memory location, such as a second memory device 206.

Since the CCD element 202 continues to integrate the second image while the first image is read out, a shutter 210 is employed in front of the CCD element 202. In some embodiments, a mechanical shutter 210 is used and is synchronized by the processor 204. The shutter 210 opens prior to the capture of the first image and remains open for the duration of the second flash. It then receives a signal to close in order to eliminate further exposure from ambient light. Examples of suitable shutters 210 are those that are commercially available and manufactured by Redlake MASD LLC of Tucson, Ariz. However, other shutters 210 may be employed in other embodiments. Further, the exposure may be controlled by the lights, the shutter 210, and/or a combination of the two in some embodiments.

The lens 208 is located in front of the shutter 210 and is selected to provide the appropriate photographic characteristics of light transmission, depth of focus, etc. In some embodiments, the lens 208 is selected between 50 and 250 mm, with the image taken at an f-stop generally in the range of f16 to f22. This provides a zone focus for the image. It also generally eliminates concerns regarding ambient light. However, it will be appreciated that any number of lenses, focusing, and f-stops may be employed in connection with the present invention.

To initiate the capture of the images, a remote control associated with the camera 144 can be used. In some embodiments, the remote control is connected to the controller 146, which generates a shutter release signal that is communicated to a shutter controller 212 of the camera 144. However, other embodiments use other methods and devices to initiate the image capture. For example, a button, switch or other device might be included on the controller 146 or connected to the camera 144. Still further, the computing device 148 is used in some embodiments to initiate the process.

A zoom controller 214 is also provided in some embodiments to mechanically adjust the lens 208 to cause the digital camera 144 to zoom in and out on a subject. In some embodiments, the remote control is used to zoom in and out on the subject. Signals from the remote control are communicated to the controller 146, which communicates the request to the zoom controller 214 of the digital camera 144. The zoom controller 214 typically includes a motor that adjusts the lens 208 accordingly.

In some embodiments, the digital camera 144 includes a video camera interface 216 and a data interface 218. The video camera interface 216 communicates live video data from the digital camera 144 to the controller 146 (or the computing device 148) in some embodiments. The data interface 218 is a data communication interface that sends and receives digital data to communicate with another device, such as the controller 146 or the computing device 148. For example, in some embodiments, the data interface 218 receives image capture messages from the controller 146 that instruct the digital camera 144 to capture one or more digital images. The data interface 218 is also used in some embodiments to transfer captured digital images from the memory 206 to another device, such as the controller 146 or the computing device 148. Examples of the video camera interface 216 and the data interface 218 are USB interfaces. In some embodiments, the video camera interface 216 and the data interface 218 are the same, while in other embodiments they are separate interfaces.

Figure 4:
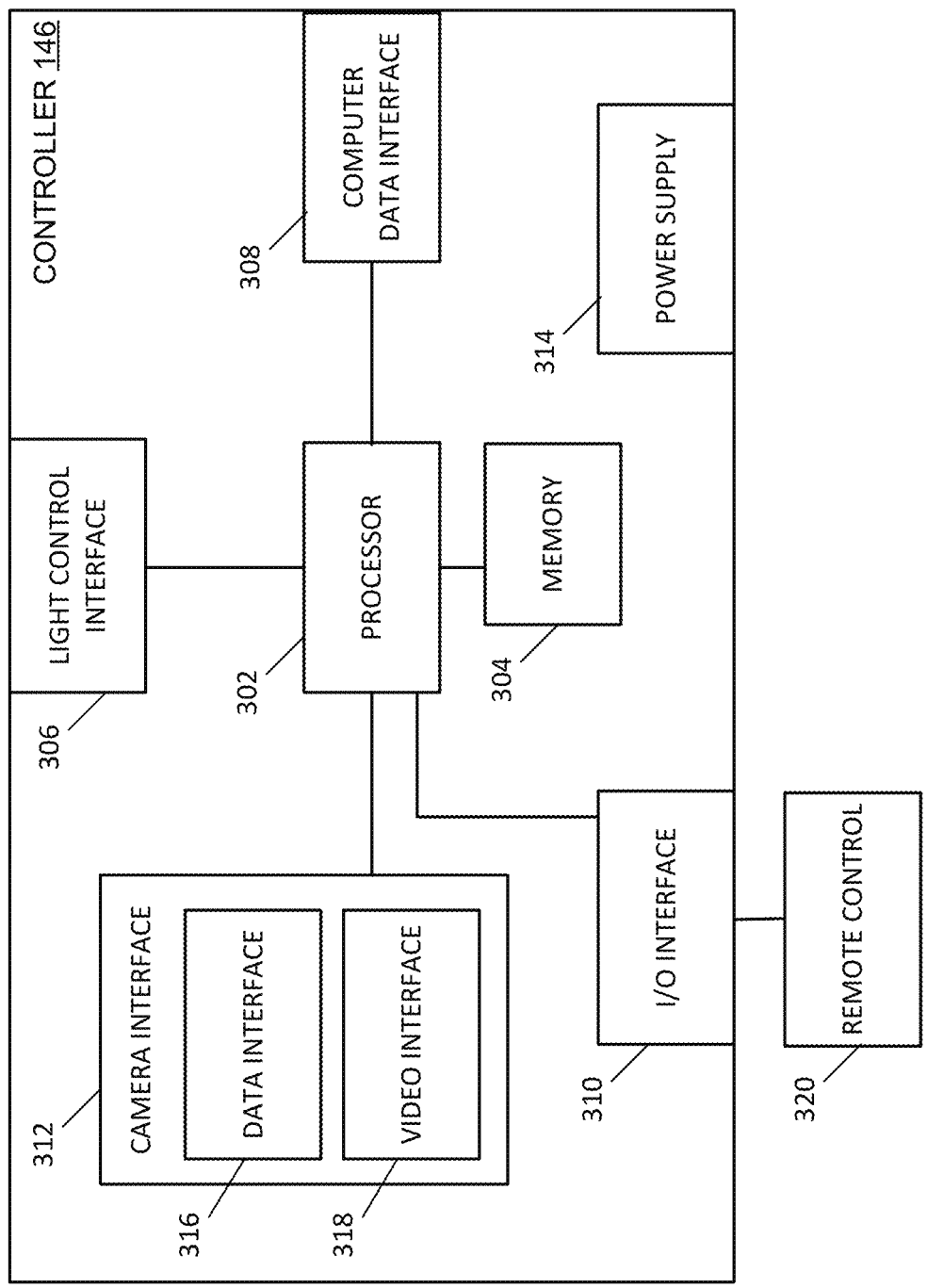
FIG. 4 is a schematic block diagram of an exemplified controller.

FIG. 4 is a schematic block diagram of an example controller 146. In this example, the controller 146 includes a processor 302, a memory 304, a light control interface 306, a computer data interface 308, an input/output interface 310, a camera interface 312, and a power supply 314. In some embodiments, the camera interface 312 includes a data interface 316 and a video interface 318.

The processor 302 performs control operations of the controller 146, and interfaces with the memory 304. Examples of suitable processors and memory are described herein.

The light control interface 306 allows the controller 146 to control the operation of one or more lights, such as the main light 158, the fill light 160, the hair light 164, and the background light 166 (shown in FIG. 2). In some embodiments, the light control interface 306 is a send only interface that does not receive return communications from the lights. Other embodiments permit bidirectional communication. The light control interface 306 is operable to selectively illuminate one or more lights at a given time. The controller 146 operates to synchronize the illumination of the lights with the operation of the camera 144.

The computer data interface 308 allows the controller 146 to send and receive digital data with the computing device 148. An example of the computer data interface 308 is a universal serial bus interface, although other communication interfaces are used in other embodiments, such as a wireless or serial bus interface.

One or more input devices, such as a remote control 320, are coupled the processing device 302 through the input/output interface 310. The input devices can be connected by any number of the input/output interfaces 310 in various embodiments, such as a parallel port, serial port, game port, universal serial bus, or wireless interface.

The camera interface 312 allows the controller 146 to communicate with the camera 144. In some embodiments, the camera interface 312 includes a data interface 316 that communicates with the data interface 218 of the camera 144 (shown in FIG. 3), and a video interface 318 that communicates with the video camera interface 216 of the camera 144 (also shown in FIG. 3). Examples of such interfaces include universal serial bus interfaces. Other embodiments include other interfaces.

In some embodiments a power supply 314 is provided to receive power, such as through a power cord, and to distribute the power to other components of the photography station 102, such as through one or more additional power cords. Other embodiments include one or more batteries. Further, in some embodiments, the controller 146 receives power from another device.

In some embodiments, the controller 146 is arranged and configured to provide a single trigger pulse at the start of the integration of the first image. This pulse may be used by the controller 146 to synchronize the lights 158, 160, 164, and 166. In one embodiment, the front or rising edge is used to trigger the background light 166 and/or the hair light 164, while the trailing or falling edge can trigger the main light 158 and/or the fill light 160. Other types of triggers and pulses may be used. For example, the controller 146 uses two different pulses in some embodiments, etc. Yet other embodiments communicate digital messages that are used to synchronize and control the various operations.

The features of the photographic scene 106 and the processes therewith, as illustrated and described herein, are not limited to a particular configuration of the photography station 102, the camera 144, and the controller 146 as illustrated above. For example, the photographic scene 106 can be used with an image capturing process with a single exposure.

Figure 5:
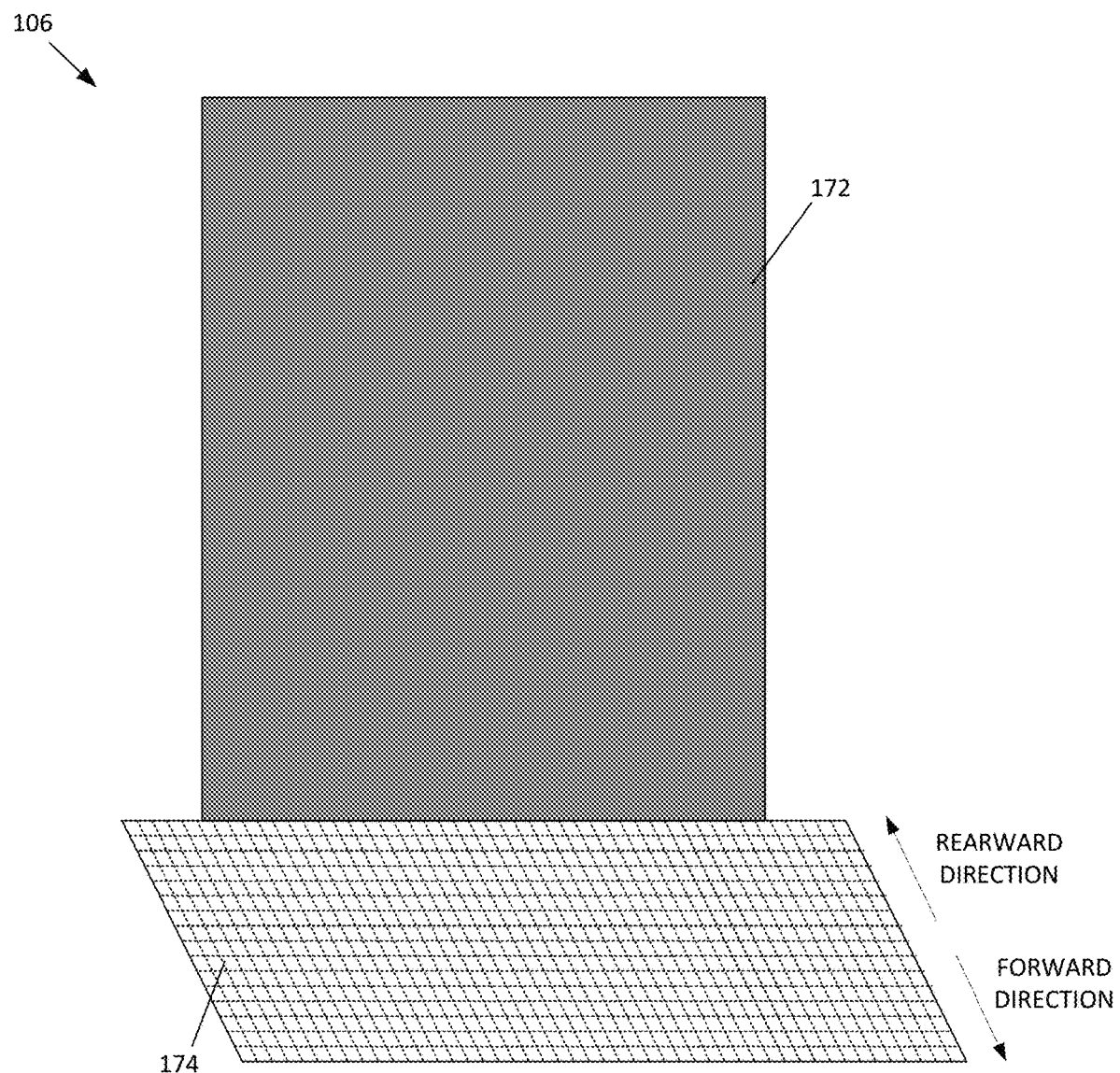
FIG. 5 is an exemplified photographic scene.

FIG. 5 is an example photographic scene 106. In some embodiments, the photographic scene 106 includes a background scene 172 and a floor scene 174.

Figure 10:
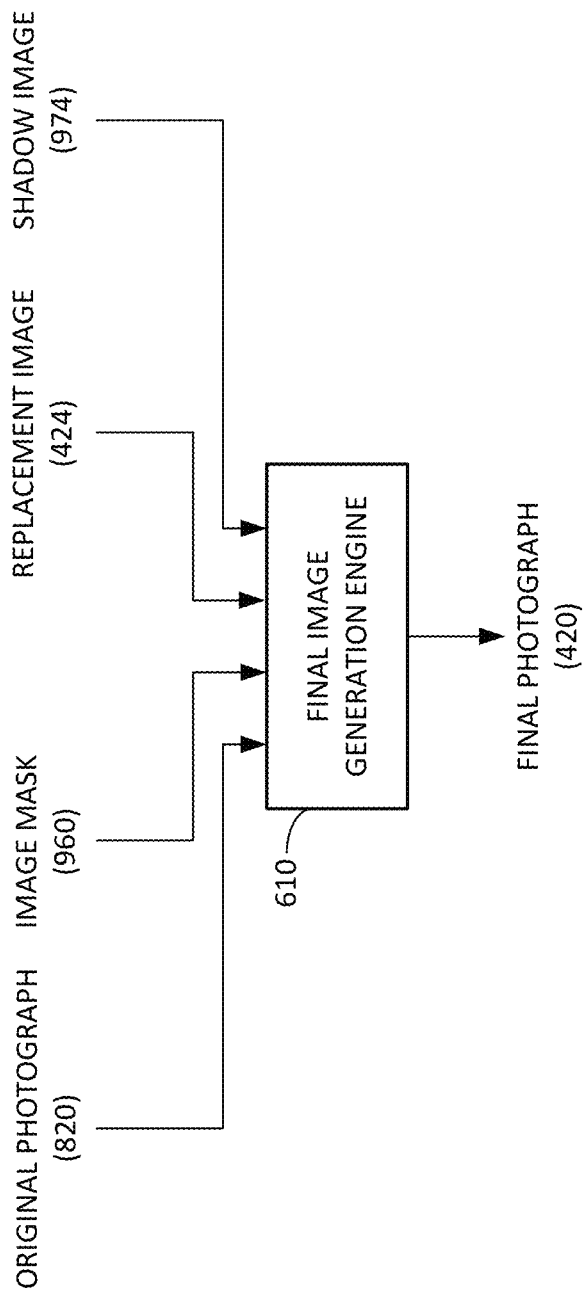
FIG. 10 illustrates an example operation of a final image generation engine.

The original photograph 820 (FIG. 10) that is captured with the digital camera 144 is processed to distinguish the subject from the photographic scene 106 in the original photograph 420 (FIG. 10). The scenes at the photographic stations are often changed such that the photographic scene in the original photograph 420 is usually unknown. It is time consuming to manually go through all the original images 820 to identify and label and enter the types of photographic scenes digitally before the images are processed by the image processing system 110. Thus, there is a need for automatically detecting, classifying the photographic scene in the original photograph 420, before any portion of the photographic scene can be replaced and personalized.

In some embodiments, the detectable pattern is a visible pattern. In other embodiments, the detectable pattern is any pattern that can be detected by a digital camera or other device. Additional tools or instruments, such as filters or prisms, can be used to assist the cameras or devices in capturing the pattern. The detectable pattern may or may not be visible to the human eye. For example, a pattern that is configured to reflect wavelengths outside a visible spectrum, such as infrared, X-ray, or ultraviolet light can be used in some embodiments.

The background scene 172 is typically a sheet of one or more materials that is arranged behind the subject while an image of the subject is captured. In some embodiments, the background scene 172 has no detectable pattern or fabric texture. In some embodiments, the background scene 172 has a monochromatic color. For example, the background scene 172 has a color, such as gray, that does not substantially add color to the subject in a digital image. In other embodiments, the background scene 172 include multiple colors and design patterns.

In some embodiments, the background scene 172 is made to be translucent so that at least some of the light from the background light 166 can pass through when the background light 166 is arranged behind the background scene 172. An example of a suitable material for the background scene 172 is a rear projection screen material. Other embodiments illuminate the background 172 from the front (but behind the subject), such that the background 172 need not be translucent. An example of a suitable background material for front illumination is a front projection screen material.

The floor scene 174 is a sheet of one or more materials that is arranged under the subject while an image of the subject is captured. In some embodiments, the floor scene 174 can have different colors and design patterns.

The floor scene 174 is considered to be distinguished from the background scene 172 in several aspects. For example, the subject is physically in contact with the floor scene 174 while the subject is not necessarily in contact with the background scene 172. Thus, the floor scene 174 causes more color casts on the subject than the background scene 172, and thus contaminates the color of the subject close to the floor scene 174. Such color cast or contamination on the part of the subject reduces color difference between the floor scene 174 and the subject, thereby making it unreliable to use conventional replacement techniques, such as chroma-key compositing, on the floor scene replacement. For example, the color cast or reflection on the subject reduces the quality of the image and makes the image look unnatural when a replacement image is added to the image. Further, the subject can generate drop shadows on the floor scene while the subject hardly produces shadows onto the background scene. Moreover, the floor scene 174 can easily become dirty or damaged (e.g., scuffed or ripped) by the subject who is physically in contact with the floor scene 174. Because of these differences, there is a need for floor scene 174 to be separately detected and classified from the background scene 172. An automated method is described below with reference to FIG. 6.

In some embodiments, the background scene 172 and the floor scene 174 are made as different sheets or pieces. In other embodiments, the background scene 172 and the floor scene 174 are made as one sheet or piece. In this example, the background scene 172 has no patterns while the floor scene 174 has predetermined patterns. In other embodiments, both the background scene 172 and the floor scene 174 have predetermined patterns. An example of the background scene 172 and the floor scene 174 is illustrated and described in more detail with reference to FIGS. 6 and 7.

In some embodiments, FIG. 6 shows a flow chart for detecting, classifying, and replacing photographic scenes in portrait images performed in the photograph personalization engine 180. Referring to FIGS. 1 and 6, a large number of sample portrait images with different known photographic scenes are provided (step 610) as input to the module 184 for training a photographic scene detection model. The photographic scenes in the sample portrait images are labeled by scene types in a library of photographic scene designs 182. These labels are also provided (step 620) as input to the module 184 for training a photographic scene detection model.

Detecting photographic scenes has been known to be a challenging task for professional photography. Conventional technologies have used saturated (green or blue) colors (Chroma-key) to make portions of the photographic scene to stand out. Inventors from the present disclosures have embedded (dot) patterns in different portions of photographic scenes to assist automated detection. During the development of the presently disclosed technologies, it has been found that training a machine-learning model to detect photographic scenes also face a lot of challenges. Portrait images include large variations in the subjects, subject's poses, subject's expressions, props, and exposure conditions. It is very difficult to achieve accurate identification of background or floor types.

In some embodiments, the sample portrait images are selected to include varying lighting conditions (step 612) such as foreground exposure, background exposure, and an exposure to a side of the subject. Moreover, the sample portrait images are selected to include subjects with varying expressions, poses, genders, ages, ethnicities, and clothing (step 614). The appearances of backgrounds, floors, and props in portrait images can be affected by above described varying parameters, which must be included for comprehensive training.

The module 184 includes a photographic scene detection model based on machine learning to be trained to automatically detect photographic scenes. The photographic scene detection model takes the sample portrait images and the labels of the photo graphic scenes therein as inputs (step 630). The photographic scene detection model can be implemented as a deep neural network such as a Convolutional Neural Network, Autoencoders, Deep Belief Nets, Recurrent Neural Networks, etc. A convolutional neural network includes multiple inter-connected layers each made of a plurality of nodes, such as an input layer, convolutional layers, max pooling layers, fully connected layers, an output layer, and optionally a subsampling layer. The training involves using the photographic scene detection model to perform initial predictions of photographic scenes in the sample portrait images (step 630). The predicted scenes are compared with the labels of the known photographic scenes in the library 182 to produce errors. The errors are distributed via backpropagation through the layers. The accuracy of the photographic scene detection model is improved by training with the large number portrait images with varying parameters and in iterations (step 630).

In one example, 16,000 portrait images comprising 16 backgrounds and varying light conditions and subjects have been used to train a photographic scene detection model. The training process described above leads to a set of learned weights and biases (step 640) in a trained photographic scene detection model (step 650). By carefully including sufficient variations, the trained photographic scene detection model in the example has demonstrated 92% accuracy with 100% accuracy for 12 background types. In other examples, the photographic scene detection model can be trained to separately detect and classify floor scenes and props in portrait images.

The trained photographic scene detection model is used in the photographic scene classification module 186. Production photographs (i.e. original photograph 820 in FIG. 10) captured at one or more photographic stations 102 (step 660) are fed to the trained photographic scene detection model (step 650). Production photographs are often produced from many photo sessions and often by different photograph stations 102. The types of photographic scenes in these production photographs are usually unknown. The trained photographic scene detection model automatically outputs photographic scene classifiers for each of the production portrait photographs (step 670). The production portrait photographs are assigned with labels of photographic scene (step 680) consistent with the library 182. Once the photographic scenes are labeled, the production portrait photographs can be personalized or enhanced by replacing one or more portions of the original photographic scene by a different scene portion (690). An example of such scene replacement by the scene replacement module 112 is illustrated in FIG. 7.

Figure 8:
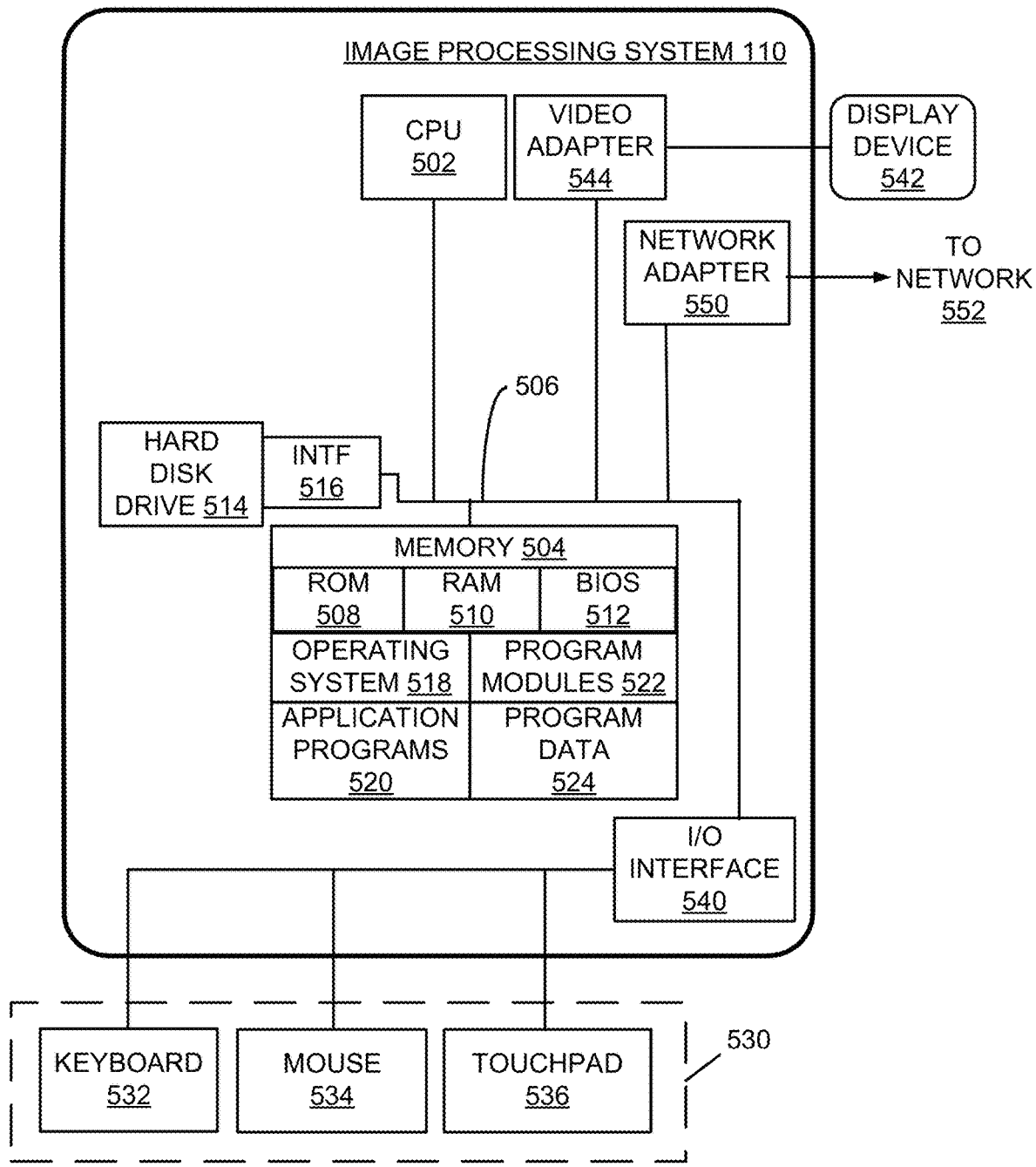
FIG. 8 is a schematic block diagram an exemplified image processing system in accordance with some embodiments of the present invention.

In some embodiments, referring to FIG. 8, an exemplified image processing system 110 includes at least one processing device 502. A variety of processing devices are available from a variety of manufacturers, for example, Intel or Advanced Micro Devices. In this example, the image processing system 110 also includes a system memory 504, and a system bus 506 that couples various system components including system memory 504 to the processing device 502. The system bus 506 is one of any number of types of bus structures including a memory bus, or memory controller; a peripheral bus; and a local bus using any of a variety of bus architectures.

The system memory 504 includes a read-only memory 508 and a random access memory 510. A basic input/output system 512, containing the basic routines that act to transfer information within the image processing system 110, such as during start up, is typically stored in the read-only memory 508.

The image processing system 110 also includes a secondary storage device 514 in some embodiments, such as a hard disk drive, for storing digital data. The secondary storage device 514 is connected to a system bus 506 by a secondary storage interface 516. The secondary storage devices 514 and their associated computer readable media provide nonvolatile storage of computer readable instructions (including application programs and program modules), data structures, and other data for image processing system 110.

Although the exemplary architecture described herein employs a hard disk drive as a secondary storage device, other types of computer readable media are included in other embodiments. Examples of these other types of computer readable media include magnetic cassettes, flash memory cards, digital video disks, Bernoulli cartridges, compact disc read only memories, digital versatile disk read only memories, random access memories, or read only memories.

A number of program modules can be stored in the secondary storage device 514 or the system memory 504, including an operating system 518, one or more application programs 520, other program modules 522, and a program data 524.

In some embodiments, a user provides inputs to the image processing system 110 through one or more input devices 530. Examples of the input devices 530 include a keyboard 532, a mouse 534, and a touchpad 536 (or a touch sensitive display). Other embodiments include other input devices 530. The input devices 530 are often connected to the processing device 502 through an input/output interface 540 that is coupled to the system bus 506. These input devices 530 can be connected by any number of input/output interfaces, such as a parallel port, serial port, game port, or a universal serial bus. Wireless communication between input devices and the interface 540 is possible as well, and includes infrared, BLUETOOTH® wireless technology, 802.11a/b/g/n wireless communication, cellular communication, or other radio frequency communication systems in some possible embodiments.

In this example embodiment, a display device 542, such as a monitor, liquid crystal display device, projector, or touch screen display device, is also connected to the system bus 506 via an interface, such as a video adapter 544. In addition to display device 542, the image processing system 110 can include various other peripheral devices (not shown), such as speakers or a printer.

When used in a local area networking environment or a wide area networking environment (such as the Internet), the image processing system 110 is typically connected to a network 552 through a network interface or adapter 550. Other possible embodiments use other communication devices. For example, some embodiments of the image processing system 110 include a modem for communicating across the network 552.

The image processing system 110 typically includes at least some form of computer-readable media. Computer readable media include any available media that can be accessed by the image processing system 110. By way of example, computer-readable media include computer readable storage media and communication media.

Computer readable storage media includes volatile and nonvolatile, removable and non-removable media implemented in any device configured to store information, such as computer readable instructions, data structures, the operating systems 518, the application programs 520, the program modules 522, the program data 524, or other data. The system memory 504 is an example of computer readable storage media. Computer readable storage media includes, but is not limited to, the read-only memory 508, the random access memory 510, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the image processing system 110.

Communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, communication media includes wired media such as a wired network or direct-wired connection, and wireless media such as acoustic, radio frequency, infrared, and other wireless media. Combinations of any of the above are also included within the scope of computer readable media.

Figure 9:
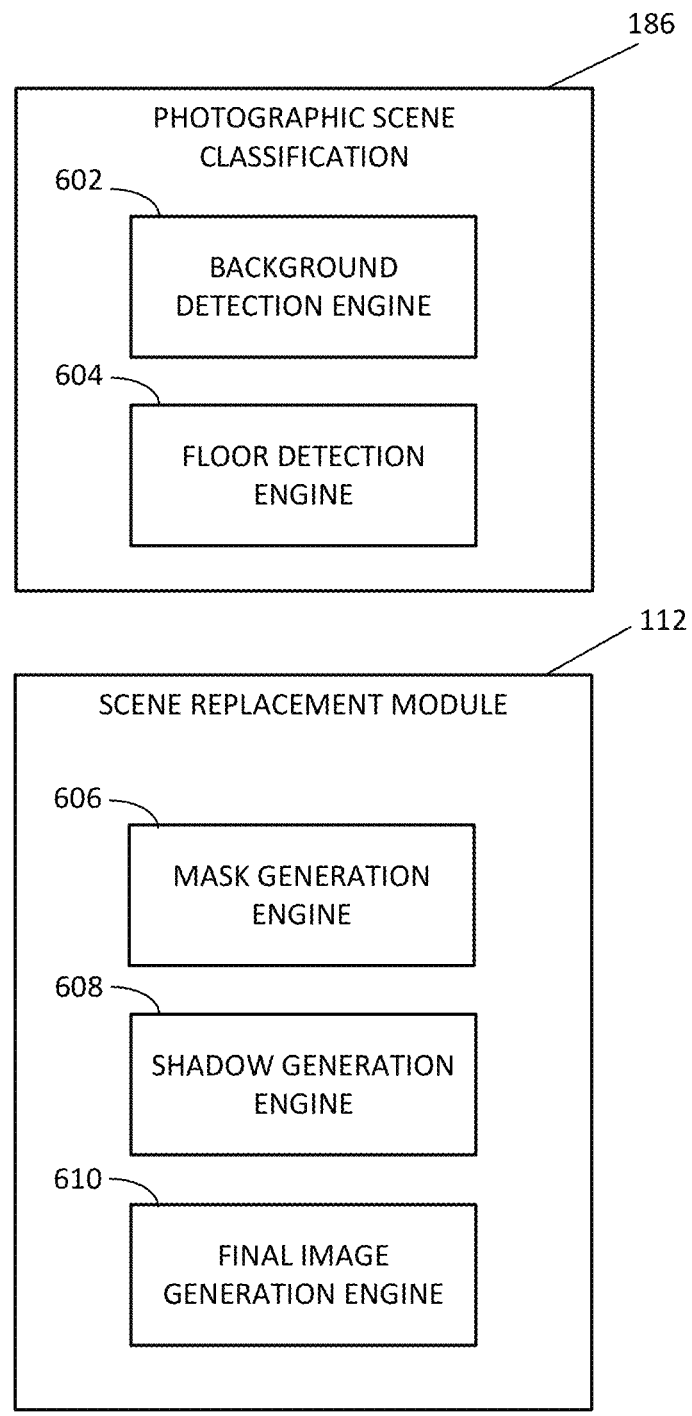
FIG. 9 is a block diagram of modules for the detection, the classification, and the replacement of photographic scenes.

In some embodiments, referring to FIG. 9, the photographic scene classification model 186 and the scene replacement module 112. The photographic scene classification model 186 includes a background detection engine 602, and a floor detection engine 604. The scene replacement module 112 includes a mask generation engine 606, a shadow generation engine 608, and a final image generation engine 610.

As described above, the scene replacement module 112 operates to replace the photographic scene 106 with the replacement image 424 by utilizing the patterned surface 402 of the scene 106. In some embodiments, the scene replacement module 112 is configured to detect the photographic scene 106, generate a mask for replacing the scene with a desired theme or replacement image 424, and produce the final photograph 422 with the replacement image 424.

The background detection engine 602, as described above in relation to the FIG. 6, operates to detect the background scene 172 for replacement with the replacement background image 426. The detection is automatically accomplished using a trained photographic scene detection model without using saturated colors or dot patterns in different portions of the photographic scenes.

The floor detection engine 604 operates to detect the floor scene 174 for replacement with the replacement floor image 428.

The mask generation engine 606 operates to generate an image mask for removing the photographic scene 106 from the original photograph 420 so as to obtain the subject only. The image mask removes the detected photographic scene from the production portrait photograph and masks the production portrait photograph with the image mask to extract the subject from the production portrait photograph. A replacement image is applied to the masked portion of the production portrait photograph.

A shadow generation engine 608 operates to generate a shadow image 974 from shadows cast on the photographic scene 106 in the original photograph 420. The original shadows cast on the photographic scene is detected. A shadow image is generated by the shadow generation engine 608 to be overlapped on the replacement image.

In some embodiments, referring to FIG. 10, the final image generation engine 610 operates to produce the final photograph 422 of the subject with the replacement image (background/floor) 424. The final image generation engine 610 operates to receive the original photograph 420, the image mask 960, the replacement image 424, and the shadow image 974, and produce the final photograph 422.

In particular, when the original photograph 420 passes through the image mask 960, the photographic scene 106 is removed and the subject 822 is obtained. Then, the obtained subject 822 without the photographic scene 106 is combined or overlapped with the replacement image 424 to produce a photograph of the subject 822 with the replacement image 424. Finally, the shadow image 974 is added to the photograph to produce the final photograph 422, which has the subject 822 with the replacement image 424 and incorporates the shadow image 974.

Figure 11:
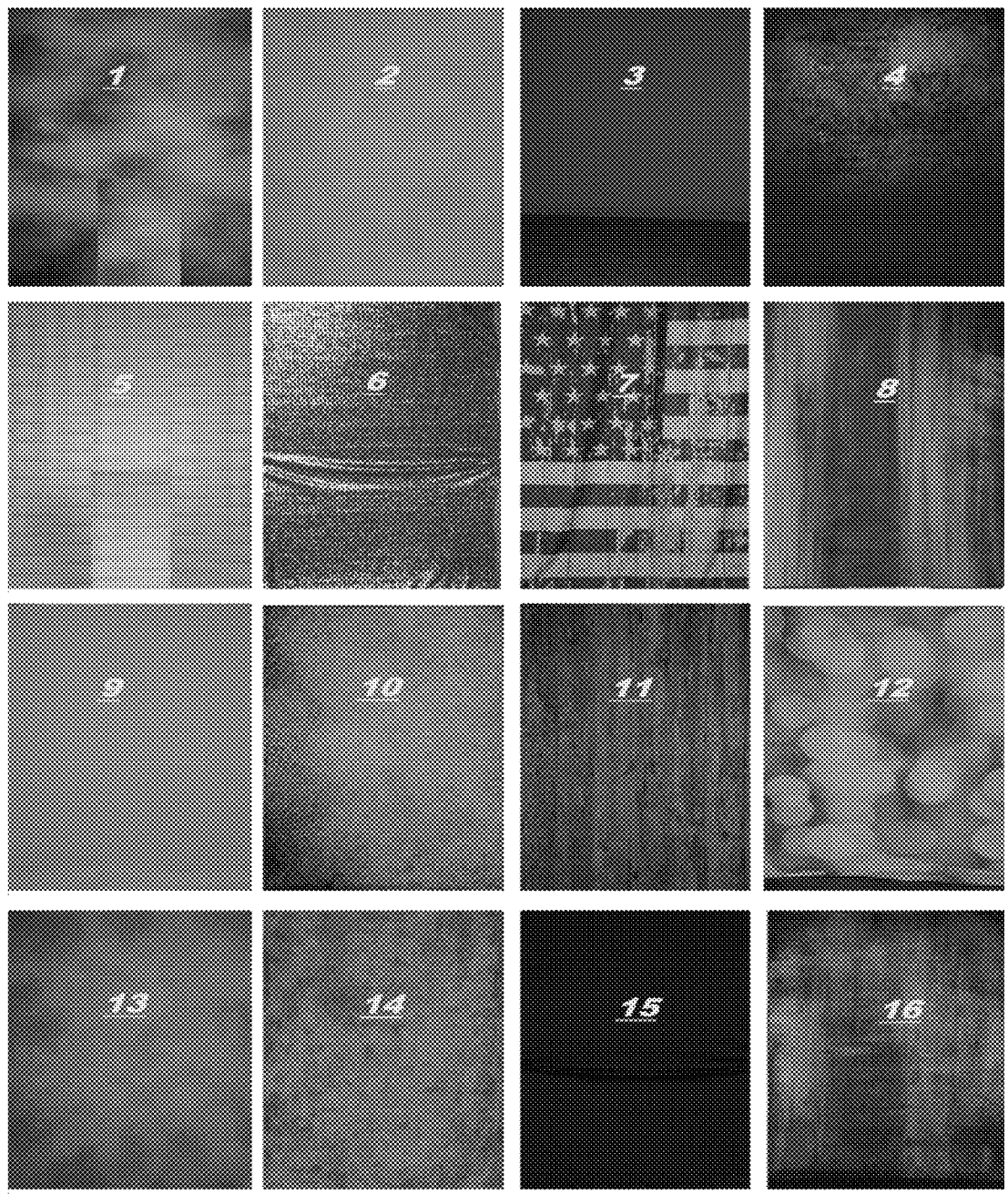
FIG. 11 illustrates exemplified backgrounds in portrait images.

In some embodiments, the photograph personalization engine 180 in FIG. 1 can employ a hybrid deep neural network to detect, classify, and replace photographic scenes in portrait images. Referring to FIGS. 1 and 11, a set of background images shown in FIG. 11 for portrait images are labeled with background types are stored in the library of photographic scene designs 182. The set of background images and their associated background types are used as input to the module 184 to train a photographic scene detection model based on the hybrid deep neural network. The training produces a trained hybrid deep neural network with built-in parameters and coefficients.

Figure 12A:
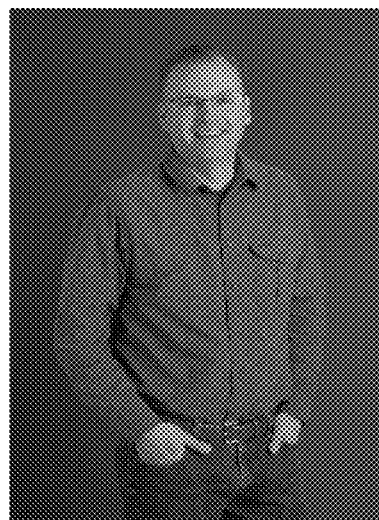
FIG. 12A illustrates extraction of a background from a portrait image.
Figure 12B:
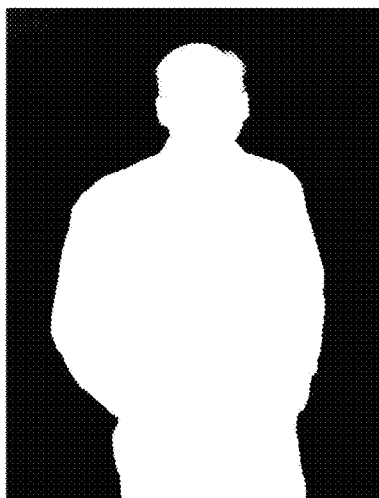
FIG. 12B further illustrates extraction of a background from a portrait image.
Figure 12C:
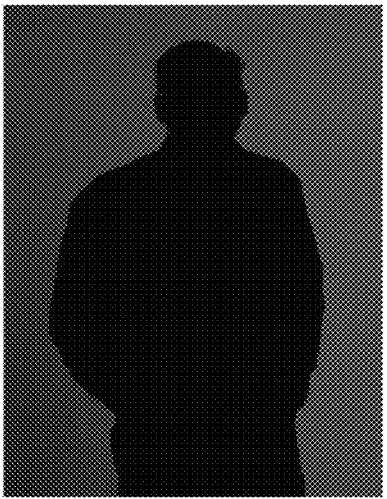
FIG. 12C further illustrates extraction of a background from a portrait image.
Figure 13:
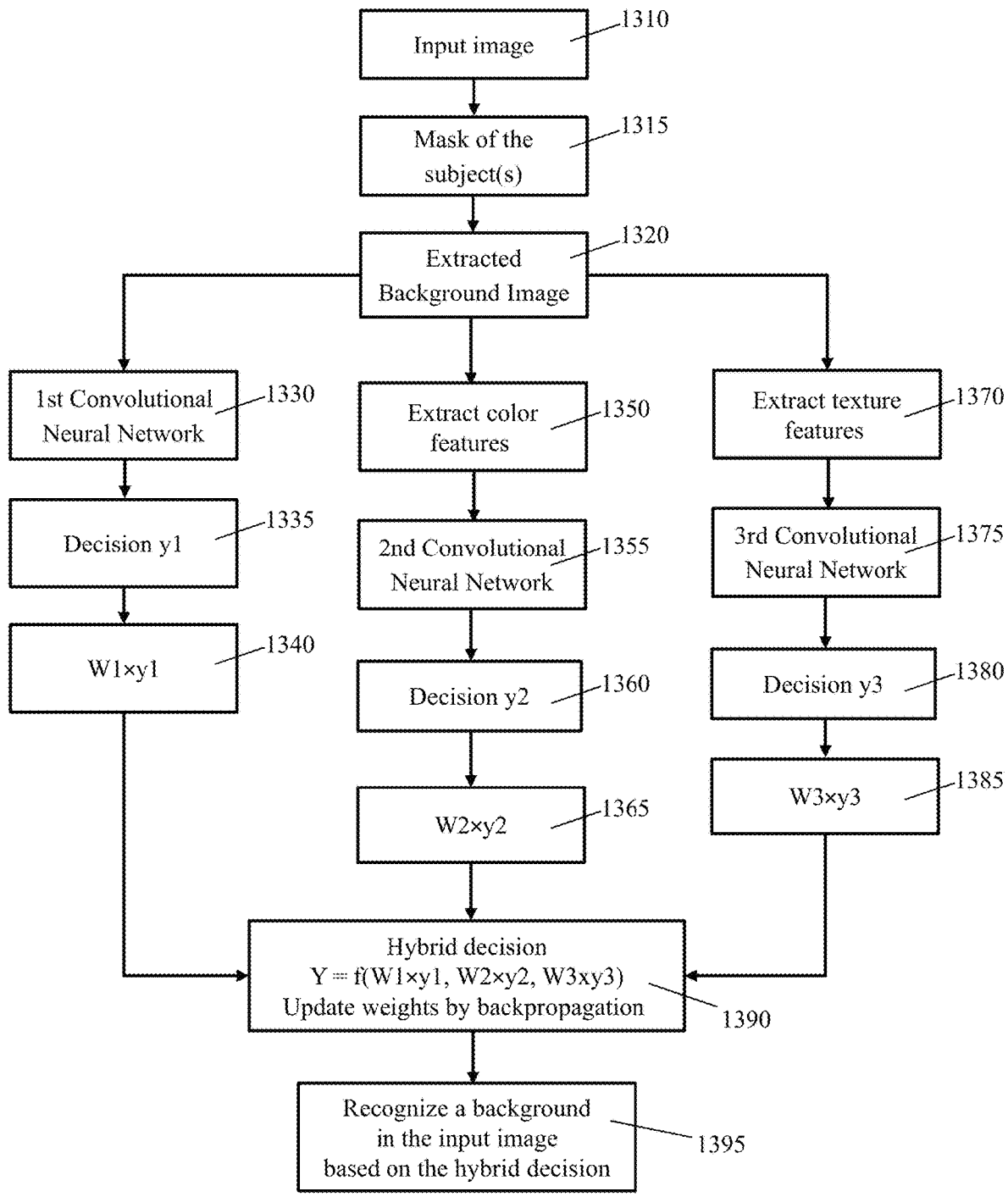
FIG. 13 is a flow chart for detecting, classifying, and replacing photographic scenes in portrait images in accordance to some embodiments of the present invention.

The photographic scene detection model based on the trained hybrid deep neural network can be used to detect and classify background types in portrait images at high accuracy. Referring to FIGS. 1, 12A-12C, and 13, a portrait photograph is received (for example by a computer processor in the photograph personalization engine 180 in FIG. 1) as an input image (step 1310), which can include, as shown in FIG. 12A, one or more subjects in front of a background. The input image can be a production photograph obtained by a photography station (102 in FIG. 1). The borders of the one or more subjects are located. The one or more subjects in the portrait image are masked (step 1315), in which areas of the one or more subjects are highlighted as shown in FIG. 12B. The one or more subjects are then removed from the portrait image to produce an extracted background as shown in FIG. 12C (step 1320). Optionally, the extracted background image is resized to 128×128 in pixels.

The disclosed hybrid deep learning model can be installed for example in a computer processor in the photograph personalization engine (180 in FIG. 1), which includes three branches. In the first branch, the extracted background image (shown in FIG. 12C) is fed into a first convolutional neural network (CNN) for training (step 1330). The output decision is saved as "y1" (step 1335). The decision y1 is multiplied by a weighting factor W1 (step 1340) to produce a first weighted decision.

In the second branch, color features are extracted from the extracted background image (shown in FIG. 12C) (step 1350). These color features can be statistical measures in its original color space (RGB) or other color spaces (HSV, LAB, YCbCr, etc.). These statistical measures can include a histogram, a mean, a standard deviation, popular color locations, etc. in the color space. Then the color features are and shaped into a 128×128 matrix. One example of such color feature is the histograms of red, green, and blue channels in the image. Each one of these histograms if calculated with 128 bins result in a 1×128 color feature vector. Therefore, we have a 3×128 array for all three channels. If we concatenate this array vertically by copying its contents over 41 times, we will have a 126×128 array. Then the red and green channels are copied one more time to finally produce a feature matrix of 128×128. This feature matrix is fed into a second convolutional neural network (step 1355). The output decision is saved as "y2" (step 1360). The decision y2 is multiplied by a weighting factor W2 (step 1365) to produce a second weighted decision.

In the third branch, texture features are extracted from the extracted background image (shown in FIG. 12C) (step 1370). These texture features can be statistical measures extracted from this image, which can include a mean, a standard deviation, entropy, a range, co-occurrence matrix, etc. Then these texture features are concatenated and shaped into a 128×128 feature matrix. On example of such texture features is the co-occurrence matrix. If this feature matrix is calculated using 8 grey levels of image, then we can obtain an 8×8 matrix. This matrix can be concatenated vertically by copying its contents over 15 times to obtain a 128×8 matrix. Finally, this matrix is concatenated horizontally by copying its contents over 15 times to produce a second feature matrix of 128×128. This feature matrix is fed into a third convolutional neural network (step 1375). The output decision is saved as "y3" (step 1380). The decision y3 is multiplied by a weighting factor W3 (step 1385) to produce a third weighted decision.

The three weighted decisions are used to obtain a hybrid decision Y that is a function of W1×y1, W2×y2, and W3×y3, that is, Y=f(W1×y1, W2×y2, W3×y3) (step 1390). For example, Y can be the average, the sum, the root-mean square, and other functions of W1×y1, W2×y2, and W3×y3. In one example, Y=(W1×y1+W2×y2+W3×y3)/3. The decision weights W1, W2, and W3 can be initialized randomly, and the decision weights are updated through the backpropagation (step 1390).

During the regular backpropagation process the network's error is minimized by calculating the gradient of the error with respect to the network's weights. This helps finding the optimized network weights. In the disclosed method, decision weights (W1, W2, and W3) are added as trainable parameters to be optimized during the backpropagation process. This helps to find the optimized decision weights for better classification accuracy.

During training using portrait photographs comprising the background types, the optimized decision weights are especially beneficial to identifying the background types considering the differences in the nature (image properties) of our 16 background types. Referring to FIG. 11, some backgrounds have solid color without any extra texture in them (e.g. background numbers 2, 3, 9, and 15). For these backgrounds perhaps a higher decision weight for color (W2) is more desirable comparing to W1 and W3. On the other hand, texture features are more prevalent for some other backgrounds (e.g. backgrounds number 4, 8, 11, 13, and 14). For these backgrounds, the texture decision weight (W3) could be higher than W1 and W2. For some other background the features automatically extracted from the image using our deep neural network are more desirable. Therefore, a higher W1 than W2 and W3 could be desired. By adding weights to these decisions and letting the backpropagation process choose the optimum weights, the disclosed hybrid deep learning model automatically takes advantage of the respective abilities of the aforementioned three neural networks (1330, 1350, 1375) to differentiate these backgrounds. Thus, the disclosed hybrid deep learning model is provided with the ground truth data and the first weight, the second weight, and the third weight associated with each background type during the training process.

A background type is recognized in the extracted background image (FIG. 12C) and thus in the input image (FIG. 12A) based on the hybrid decision (step 1395). The input portrait image is then assigned to be associated the background type, which is one of the background types stored in the library of photographic scene designs 182. Once the background type is labeled, the portrait image can be personalized or enhanced by replacing one or more portions of the original photographic scene by a different background type. An example of such scene replacement by the scene replacement module 112 is illustrated in FIG. 7.

Once the background type in the input image or a portrait photograph is identified, the portrait photograph can be personalized or enhanced by replacing the existing background therein by a different type of background.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system for automatically detecting a photographic scene in a captured image of a subject, the system comprising:
   a processor; and
   a memory coupled to the processor and storing instructions that, when executed by the processor, cause the system to:
   train a machine learning model using a plurality of sample images of subjects that include known photographic scenes defined in a library of photographic scene designs for portrait photography;
   receive a new image captured of a subject in a photographic scene, the photographic scene being an unknown photographic scene that is defined by a photographic scene design in the library; and
   automatically identify, using the trained machine learning model, the photographic scene in the new image as one of the photographic scene designs in the library.

2. The system of claim 1, wherein the plurality of sample images of subjects are associated with labels indicating a scene type of the known photographic scenes included therein, and the labels are also used to train the machine learning model.

3. The system of claim 2, wherein the machine learning model is a deep neural network comprising a plurality of layers, and to train the machine learning model, the instructions that, when executed by the processor, cause the system to:
   provide, as input to the machine learning model, a sample image from the plurality of sample images that includes a known photographic scene from the known photographic scenes;
   receive, as output of the machine learning model, a predicted photographic scene;
   determine an error by comparing a scene type of the predicted photographic scene to a label associated with the sample image indicating the scene type for the known photographic scene included in the sample image; and
   minimize the error using backpropagation through the plurality of layers to learn one or more of weights and biases of the machine learning model.

4. The system of claim 1, wherein the plurality of sample images of subjects include at least one of:
   varied known photographic scenes;
   varied lighting conditions illuminating the subjects; and
   varied expressions, poses, genders, ages, ethnicities, and clothing of the subjects.

5. The system of claim 1, wherein the instructions, when executed by the processor, further cause the system to classify, using the trained machine learning model, one or more components of the photographic scene automatically identified in the new image.

6. The system of claim 5, wherein the one or more components include at least one of a background portion, a floor portion, and a prop.

7. The system of claim 6, wherein when the photographic scene includes the background portion and the floor portion, the floor portion is automatically identified by the trained machine learning model separately from the background portion.

8. The system of claim 6, wherein the trained machine learning model is a hybrid deep neural network comprising at least three convolutional neural networks, and to automatically identify at least the background portion of the photographic scene in the new image, the instructions, when executed by the processor, further cause the system to:
   remove the subject from the new image to produce a background image;
   provide the background image into a first of the at least three convolutional neural networks to obtain a first decision;
   automatically extract color features from the background image;
   transform the color features into a two-dimensional color feature matrix;
   feed the two-dimensional color feature matrix into a second of the at least three convolutional neural networks to obtain a second decision;
   automatically extract texture features from the background image;
   transform the texture features into a two-dimensional texture feature matrix;
   feed the two-dimensional texture feature matrix into a third of the at least three convolutional neural networks to obtain a third decision;
   compute a hybrid decision based on the first decision, the second decision, and the third decision; and
   identify a background type in the background image based on the hybrid decision.

9. The system of claim 8, wherein to compute the hybrid decision, the instructions, when executed by the processor, further cause the system to:
- multiply the first decision by a first weight to produce a first weighted decision;
- multiply the second decision by a second weight to produce a second weighted decision;
- multiply the third decision third by a third weight to produce a third weighted decision; and
- compute the hybrid decision based on the first weighted decision, and the second weighted decision, and the third weighted decision.

10. The system of claim 9, wherein an error associated with a value of the computed hybrid decision is minimized using backpropagation to adjust one or more of the first weight, the second weight, and the third weight.

11. A method for automatically detecting a photographic scene in a captured image of a subject, the method comprising:
- receiving a plurality of sample images of subjects that include known photographic scenes defined in a library of photographic scene designs for portrait photography, wherein the plurality of sample images of subjects are associated with labels indicating a scene type of the known photographic scenes included therein;
- training a machine learning model using the plurality of sample images and the labels;
- receiving a new image captured of a subject in a photographic scene, the photographic scene being an unknown photographic scene that is defined by a photographic scene design in the library; and
- automatically identifying, using the trained machine learning model, the photographic scene in the new image as one of the photographic scene designs in the library.

12. The method of claim 11, wherein training the machine learning model using the plurality of sample images and the labels further comprises:
- for each sample image from at least a portion of the plurality of sample images:
  - providing, as input to the machine learning model, the sample image that includes a known photographic scene from the known photographic scenes;
  - receiving, as output of the machine learning model, a predicted photographic scene;
  - comparing a scene type of the predicted photographic scene to one of the labels associated with the sample image indicating the scene type for the known photographic scene included therein to determine an error; and
  - minimizing the error using backpropagation.

13. The method of claim 11, further comprising:
- identifying, using the trained machine learning model, a label associated with a scene type of the photographic scene automatically identified in the new image that is consistent with a label for a scene type of a known photographic scene defined in the library that corresponds to the scene type of the photographic scene automatically identified in the new image; and
- assigning the label to the new image.

14. The method of claim 13, further comprising:
- transmitting the labeled new image to an image processing system for processing to distinguish the subject from the photographic scene and enable replacement of one or more portions of the photographic scene, the one or more portions of the photographic scene including at least one of a background portion, a floor portion, and a prop portion.

15. A system for automatically detecting a photographic scene in a captured image of a subject, the system comprising:
- a data store comprising:
  - a library of photographic scene designs defining known photographic scenes for portrait photography, wherein each of the known photographic scenes defined in the library is associated with a label identifying a scene type of the known photographic scene; and
  - a plurality of sample images of subjects that each include at least one of the known photographic scenes and are each associated with the respective label identifying the scene type of the at least one known photographic scene included in the sample image;
- a photographic scene detection model; and
- a computing device comprising a processor and a memory coupled to the processor and storing instructions that, when executed by the processor, cause the system to:
  - retrieve from the data store, data for training the photographic scene detection model, the data including at least a portion of the plurality of sample images and the respective label identifying the scene type of the at least one known photographic scene included in each sample image of the portion retrieved;
  - provide, as input to the photographic scene detection model, the retrieved data to train the photographic scene detection model using machine learning;
  - after the photographic scene detection model is trained, receive, from an image capture system, a new image of a subject in a photographic scene captured by the image capture system, the photographic scene being an unknown photographic scene that is defined by a photographic scene design in the library;
  - provide, as input to the trained photographic scene detection model, the new image for automatically identifying the photographic scene; and
  - receive, as output of the photographic scene detection model, an identification of the photographic scene automatically identified in the new image as one of the photographic scene designs in the library by the trained machine learning model.

16. The system of claim 15, wherein the photographic scene detection model is a deep neural network comprising a plurality of layers, and to train the photographic scene detection model, the instructions that, when executed by the processor, cause the system to:
- provide, as input to the photographic scene detection model, the portion of the plurality of sample images, each including the at least one known photographic scene;
- receive, as output of the photographic scene detection model, a predicted photographic scene for each sample image within the portion;
- for each predicted photographic scene, compare a scene type of the predicted photographic scene to the respective label identifying the scene type of the at least one known photographic scene included in the respective sample image to determine an error; and
- minimize the error using backpropagation through the plurality of layers to learn one or more of weights and biases of the photographic scene detection model.

17. The system of claim 15, wherein the photographic scene detection model further classifies one or more components of the photographic scene automatically identified in the new image, the one or more components including at least one of a background portion, a floor portion, and a prop.

18. The system of claim 17, wherein the photographic scene automatically identified includes the background portion, the trained photographic scene detection model is a hybrid deep neural network comprising at least three convolutional neural networks, and to automatically identify the background portion of the photographic scene in the new image, the instructions, when executed by the processor, further cause the system to:
- remove the subject from the new image to produce a background image;
- provide the background image into a first of the at least three convolutional neural networks to obtain a first decision;
- automatically extract color features from the background image;
- transform the color features into a two-dimensional color feature matrix;
- feed the two-dimensional color feature matrix into a second of the at least three convolutional neural networks to obtain a second decision;
- automatically extract texture features from the background image;
- transform the texture features into a two-dimensional texture feature matrix;
- feed the two-dimensional texture feature matrix into a third of the at least three convolutional neural networks to obtain a third decision;
- compute a hybrid decision based on the first decision, the second decision, and the third decision; and
- identify a background type in the background image based on the hybrid decision.

19. The system of claim 1, wherein the plurality of sample images are captured by a photography station including a frame configured to support the photographic scene in the new image.

20. The system of claim 4, wherein the plurality of sample images are captured by a photography station including a plurality of lighting devices configured to generate the varied lighting conditions.

* * * * *